US005697760A

United States Patent [19]
Rosen

[11] Patent Number: 5,697,760
[45] Date of Patent: Dec. 16, 1997

[54] PRODUCTION METHOD FOR LAWN SOD ROLLS AND A DEVICE TO PERFORM THE METHOD

[76] Inventor: Kjell Rosen, 753 A Kolunda, Eskiltuna, Sweden, 63519

[21] Appl. No.: 707,822

[22] Filed: Sep. 4, 1996

Related U.S. Application Data

[63] Continuation of Ser. No. 276,732, Jul. 18, 1994, abandoned.

[30] Foreign Application Priority Data

Jun. 17, 1994 [SE] Sweden .................. 94.02151

[51] Int. Cl.⁶ .................................................. B65G 67/02
[52] U.S. Cl. .................. 414/789.7; 414/786; 414/792; 414/437
[58] Field of Search .................. 414/789.7, 792, 414/792.1, 794.7, 437, 502, 786; 172/19, 20, 33

[56] References Cited

U.S. PATENT DOCUMENTS

| | | | |
|---|---|---|---|
| 3,596,777 | 8/1971 | Neely, Jr. | 414/789.7 |
| 3,698,534 | 10/1972 | Hadfield | 414/789.7 |
| 3,788,495 | 1/1974 | Fachini et al. | 414/792.1 |
| 3,887,013 | 6/1975 | Helberg | 172/20 |
| 4,162,709 | 7/1979 | Wilson | 172/20 |
| 4,273,488 | 6/1981 | Hill et al. | 414/792.1 |
| 4,777,890 | 10/1988 | Raymond | 172/19 |
| 4,828,040 | 5/1989 | Schumacher | 172/20 |
| 4,832,130 | 5/1989 | Brouwer et al. | 172/19 |
| 4,966,239 | 10/1990 | Hutchison | 414/789.7 |
| 5,165,617 | 11/1992 | van Vuuren | 172/20 |
| 5,165,843 | 11/1992 | Hendriks et al. | 414/792 |
| 5,217,078 | 6/1993 | Zinn | 414/789.7 |
| 5,230,602 | 7/1993 | Schouten . | |
| 5,269,379 | 12/1993 | Millar et al. | 414/789.7 |

FOREIGN PATENT DOCUMENTS

| | | | |
|---|---|---|---|
| 931172 | 7/1973 | Canada | 172/20 |
| 835913 | 6/1981 | U.S.S.R. | 414/792 |

*Primary Examiner*—Karen B. Merritt
*Assistant Examiner*—Douglas Hess
*Attorney, Agent, or Firm*—Dowell & Dowell

[57] ABSTRACT

A method and harvesting apparatus for stacking cut sod wherein the cut sod is formed into rolls at a rolling station carried by a machine and wherein alternating first and second series of rolls are conveyed in a first direction relative to a stacking station so as to form in the stacking station alternating first and second layers of rolls which are oriented generally perpendicularly to one another and wherein the rolls in each layer are oriented generally parallel with respect to one another. The second series of rolls are partially rotated approximately 90° as they are conveyed to the stacking station so the second series of rolls are oriented generally perpendicularly with respect to the first series rolls. The apparatus also includes a wrapping device which is movable with respect to the stacking station so as to be maneuverable about the layers of sod rolls which are formed within the stacking station. The harvester further includes a unique driving configuration wherein the operator is positioned in the rear of the machine, thereby allowing a full field of view with respect to each of the operating stations of the apparatus.

17 Claims, 7 Drawing Sheets

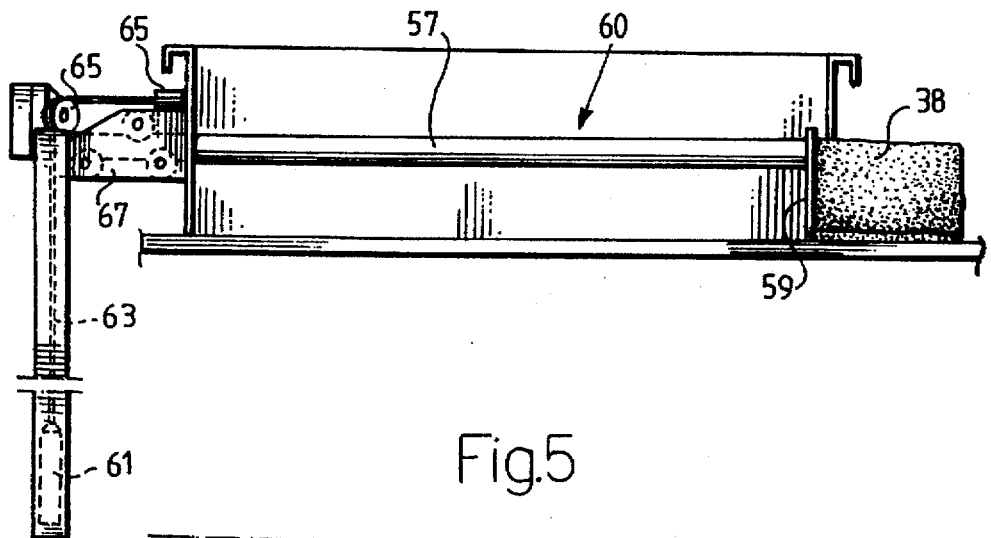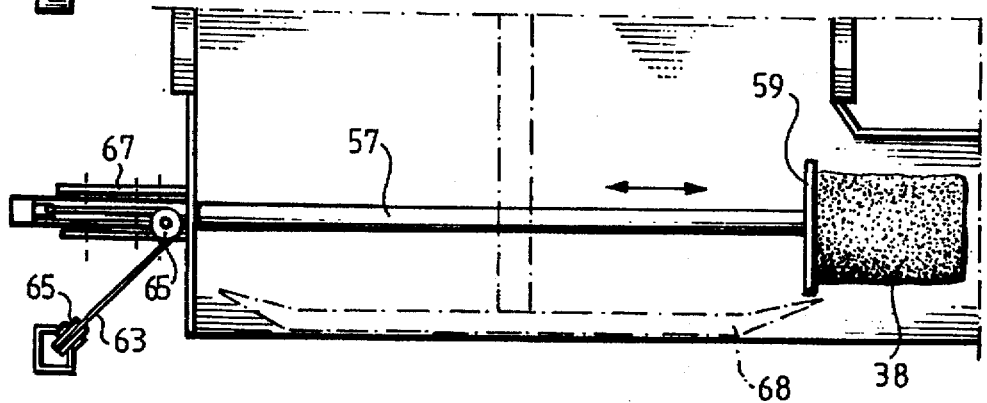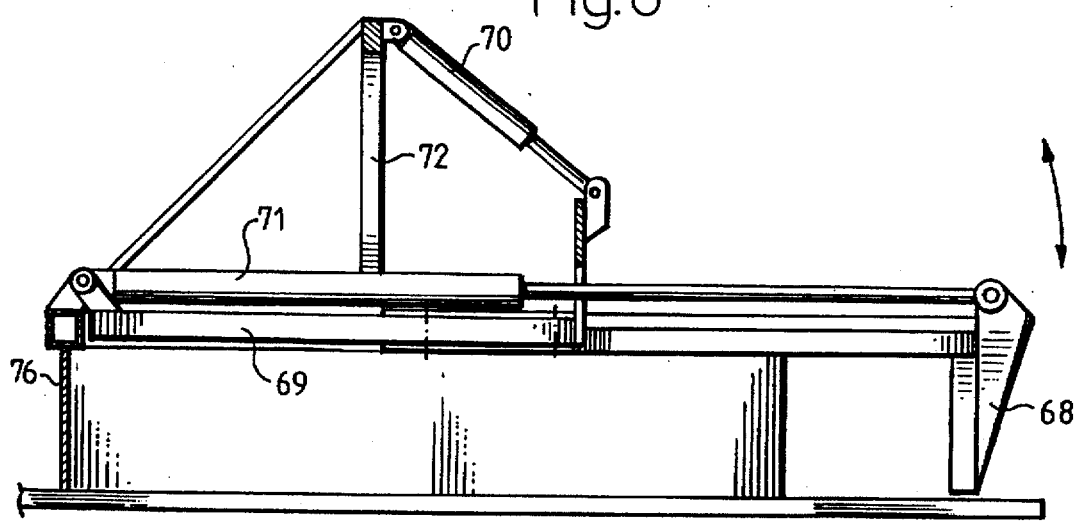

PRODUCTION METHOD FOR LAWN SOD ROLLS AND A DEVICE TO PERFORM THE METHOD

This application is a continuation of application Ser. No. 08/276,732, filed Jul. 18, 1994 now abandoned.

BACKGROUND OF THE INVENTION

1. Field of the Invention

The present invention relates to a device to harvest sod pieces which are formed into rolls and thereafter stacked for storage and further transportation to an application area.

2. History of the Related Art

When harvesting lawn sod rolls, here below even called sod rolls, machines are used comprising cutting and pick-up devices which cut and pick up pieses of a lawn, transportation devices which form the sod rolls out of these pieces and transport these to stacking devices which assemble and stack the sod rolls in a storage area. To achieve a steady stacking of the sod rolls which will not fall down, the rolls in each layer must be turned about a quarter of a turn or 90 degrees relative to the rolls of adjacent layers. i.e. the above and the beneath layers.

Previously sod roll harvesting machines were used, where the driver was sitting on top of the pick-up unit and a collaborator was placed at the transport and stacking device taking care of the rolls and stacking these in the previously way.

To facilitate the roll stacking operation and to achieve a machine to possibly be operated by only one operator it is, from Swedish patent 9002919-0, already known to stack the rolls in a closed storage or stacking area to be turned 90 degrees for each layer or bed with rolls to be stacked in a transverse direction with respect to the adjacent layers. i.e. the above and the beneath layers. In this way one operator can operate the machine and simultaneously survey the roll transportation to a storage area and the stacking of the rolls therein. During the deposition of a complete stack of rolls one side of the storage area is opened and the stack, normally placed on a pallet, is place on the ground, after that, the upper roll layer is fixed by means of a loose frame with hooks. After that, the upper stack part is covered with plastic and the frame removed and the roll stack is ready for storage or for transportation.

SUMMARY OF THE INVENTION

According to the present invention another way may be chosen to solve the stacking problem of the completed rolls.

The main purpose of the invention is to achieve a simplified stacking device providing the use of a generally open storage area or bin wherein the stick is not turned, and the roll stack then removed from the machine without any help from the operator.

Another purpose is to achieve a stacking device, the plastic covering of the upper layer being provided automatically after completing the stack.

Another purpose is to achieve a sod pick-up machine with a suitable design with respect to its operation so to be easily controlled and operated by one operator with a sufficient survey over the whole pick-up and stacking process.

These and other purposes and advantages of the invention are achieved by providing the device with the characteristics specified in the attached claims.

BRIEF DESCRIPTION OF THE DRAWINGS

A preferred embodiment of the invention will be described more in detail in connection with the drawings. And thus FIG. 4 shows a side view of a detail of a bucker for the sod rolls, FIG. 5 shows a top plan view of the device in FIG. 4, FIG. 6 shows a side view of a detail of a rake to push the sod rolls into a storage or stacking bin.

DESCRIPTION OF THE PREFERRED EMBODIMENT

Figure 1:
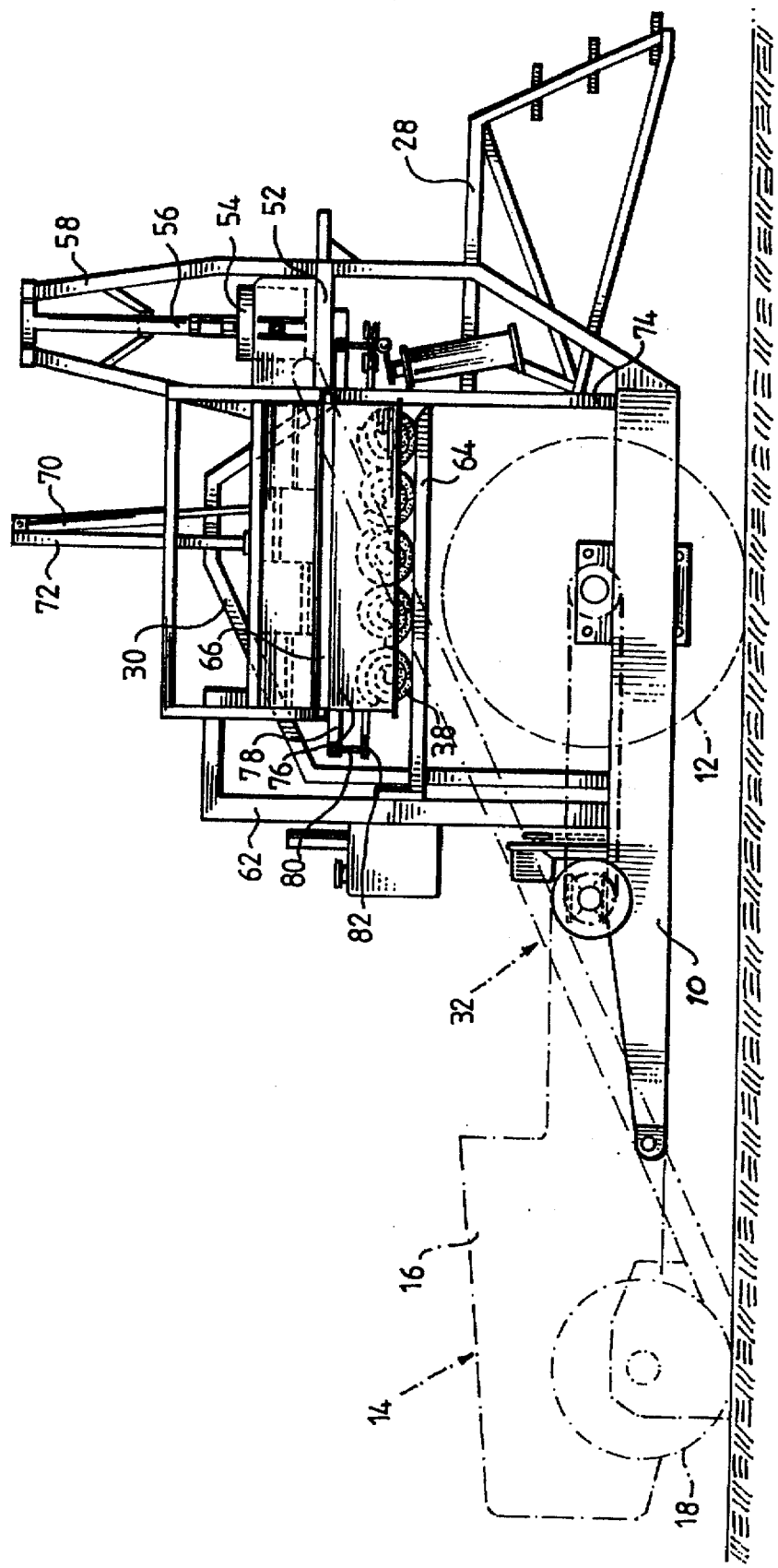
FIG. 1 shows a side view of a sod pick-up machine according to the invention.

In the shown embodiment the lawn pick-up machine comprises a machine frame or a framework 10 carrying the appertaining stations or units. The framework 10, on one side is equipped with driving wheels 12 mounted in bearings on the lower machine portion and is rigidly connected to a front driving unit 14. This driving unit illustrated with dotted lines comprises, in the shown embodiment, an ordinary tractor with a motor 16 and front wheels 18. The rear axle of the tractor 14 is rigidly fastened to the frame 10 and its back driving wheels are removed and replaced by gears 22, which by means of chains, driving belts 24 or similar devices are connected with corresponding gears 26 on the driving wheels 12. In that way the lawn pick-up machine of the invention can be linked to an already existing tractor, thereby substantially reducing the costs for the complete machine. The framework 10 can of course be lengthened at the front and in itself comprise forward wheels and driving units without departing from the scope of the invention. The framework 10 has a platform 28 forming the driver seat at the back. To enable the operators action the steering and all other controls (not shown) for the driving of the machine are lifted up onto the platform 28 by means of any known technology, such as a hydraulic transmission, electric connections or the like. With the driver seat arranged at the back on the framework 10 the operator has a complete survey over the driving unit in front of him and can easily drive and control the machine and its performance from the platform 28. Even the units for pick-up, transportation, rolling, rotation and stacking of the sod pieces and the sod rolls, respectively, are situated in front of the operator and he thereby can survey these functions of the machine and adjust and stop the complete sod roll treating process if any bad performance of the units should occur.

By means of a side frame 30 the framework 10 supports a lawn cutting and pick-up unit 32, which in a known way comprises a cutting head 34 with a vibrating cutter for loosening the lawn in the longitudinal direction of the unit and a cropper deviding the cut lawn into convenient lengths to form the desired sod rolls. The unit 34 comprises also rolls and/or bristles to trim the lawn before pick-up and also register wheels to achieve equally long pieces and thereby equally sized sod rolls. The components of the unit 34 are already known and are therefore not illustrated or described here.

The conveyor 32 transports the loosened cut lawn pieces up to a rolling device comprising a conveyor belt cooperating with the conveyor and running in opposite direction, arranged above the conveyor 32 at its upper end. Such a rolling unit is illustrated and described in the previously mentioned Swedish patent, being here referred to, and is therefore not shown in any further detail. Other kinds of units can of course be used within the scope of the invention to form the rolls of the separated pieces. At the upper end of the conveyor 32 a belt conveyor 36 is arranged tranverse with respect to the machine driving direction, on which conveyor the completed sod rolls 38 are transported to the stacking and storing station. At the end of the conveyor 36 near the stacking station a rotation device is placed to turn the rolls one quarter of a turn before they reach the feeding unit of the stacking device. The rotation causes the sod rolls of every second layer to be placed tranverse to the rolls in the adjacent layers, thereby locking the sod rolls in the above and beneath placed layer or bed. The rotation device comprises a lever 40 with a crook 42, the lever being supported in a bearing 44 and, by means of a spring 46, is pushed to a position in which the lever is hitting a stop 48 with its crook engaging the end surface of the sod roll 38. The lever can be pushed against the spring force to another position with the crook situated outside the sod roll passage, and, in which second position, the lever can be locked by means of a solenoid piston 50 or a similar control device. When the lever 40 is in the active position in contact with the stop 48 and a roll with its end hits the crook 42, the roll will by means of the feeding force of the conveyor 36 be turned a quarter of a turn, as indicated by the sod roll shown in dotted lines, the lever 40 with the crook 42 holding the roll end against the force of spring 46. The lever 40 returns, when the sod roll 38 has been transported to another position, the lever contacts the stop 48 to catch the next sod roll 38 to be rotated. When putting down a layer of sod rolls not to be rotated, the lever 40 is situated in the position shown in dotted lines, in which position the lever is locked by means of the locking solenoid 50.

Figure 3:
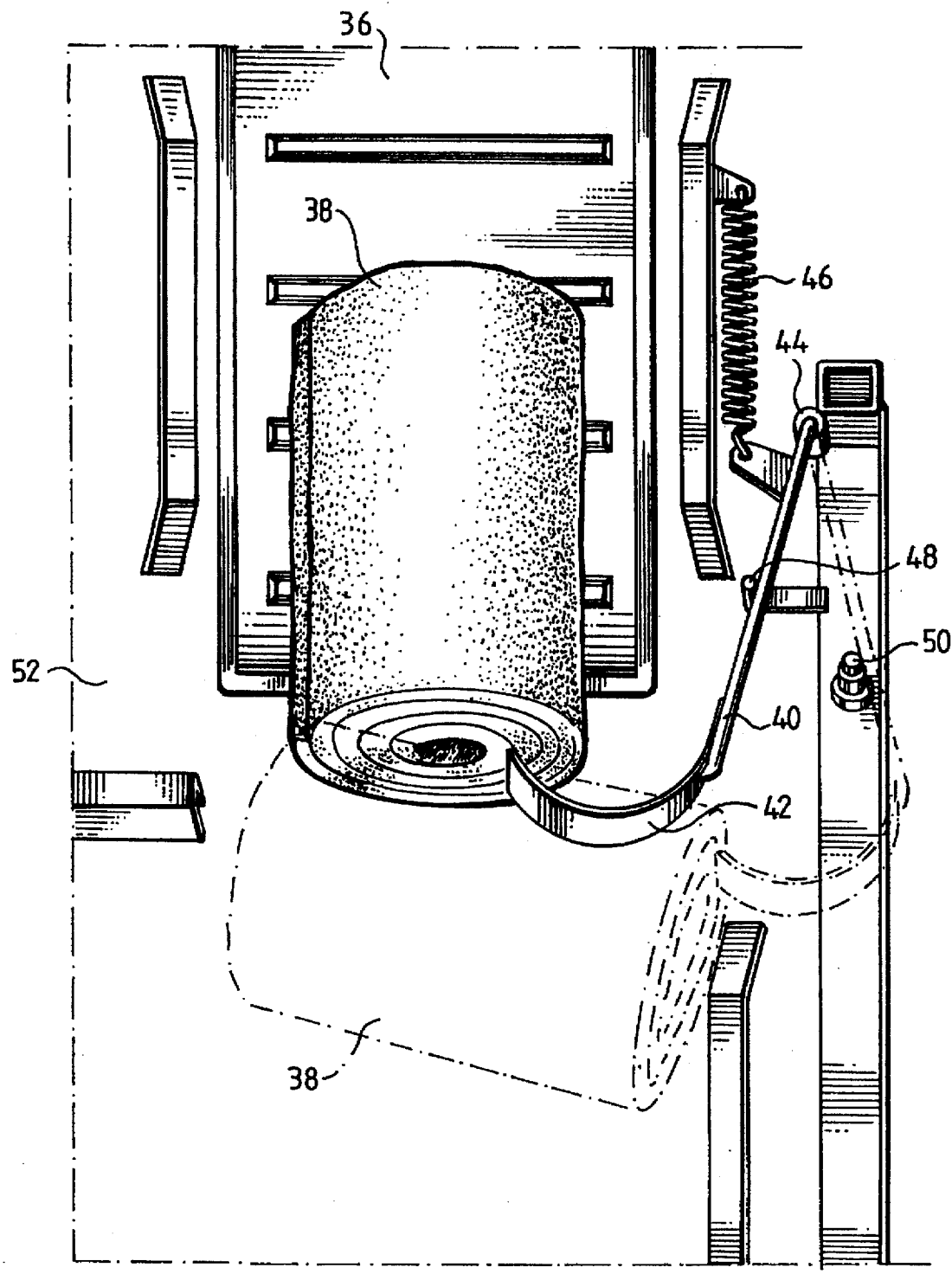
FIG. 3 shows a partial top view of the tranverse transportation and rotating device for the sod rolls of the machine.

With the roll 38 having been turned to the position shown in dotted lines in FIG. 3, it is pushed onto a feeding mat 52 by means of a rake 54 which by means of a lever 56 is supported in a rack on top of the conveyor belt 36 and is controlled by means of a hydraulic cylinder. The lever 56 of the rake 54 is coupled in such a way that the rake 54 rigidly moves the roll 38 to a desired position on the mat 52, i.e. so that the roll is pushed onto the mat and is freed from the lever 40 42. The next roll may then be possibly rotated in the previously mentioned way. The following movement of the roll to the mat end is provided by the next sod rolls pushing from behind by means of the rake. Thus, the rake does not have to move along the entire length of the mat 52. When returning to the original position at the end of the conveyor 36 the rake 54 is bending and passes the upper side of the next roll 38. The movement of the roll 38 over the mat 52 by means of the rake 54 is performed against a bucker 60 (FIG. 4 and FIG. 5) consisting of a shaft 57 and a thrust plate 59 and bending under the load of the rake 54. Thus, the roll 38 will face upwards, its longitudinal axis becoming perpendicular to the logitudinal axis of the rolls 38 situated on the conveyor 36. The bucker 60 guided in a guide 67 is under pressure by means of a load 61 which by means of a cord 63 conducted over pulleys 65 provides the necessary resistance against any movement of the sod rolls 38 across the mat 52.

Obviously the purpose of the rotation device is to turn the rolls 38 in every second layer before they are stacked in the storeroom, implying the rolls 38 in the other layers or beds not be turned, the lever 40, as mentioned, lying in an inactive position and being locked by means of the solenoid 50. The further transportation over the mat 52 of the rolls not been turned is performed in the same way by the rake 54.

It is obvious that the shown rotation device can be achieved in other ways than that shown here, even if this one is preferred due to its quick operation. Thus it is possible to arrange a rotary disc at the end of the conveyor 36, on which the sod roll 38 is ejected and which together with the sod roll is rotated a quarter of a turn by means of a control device such as a rotary motor.

Figure 2:
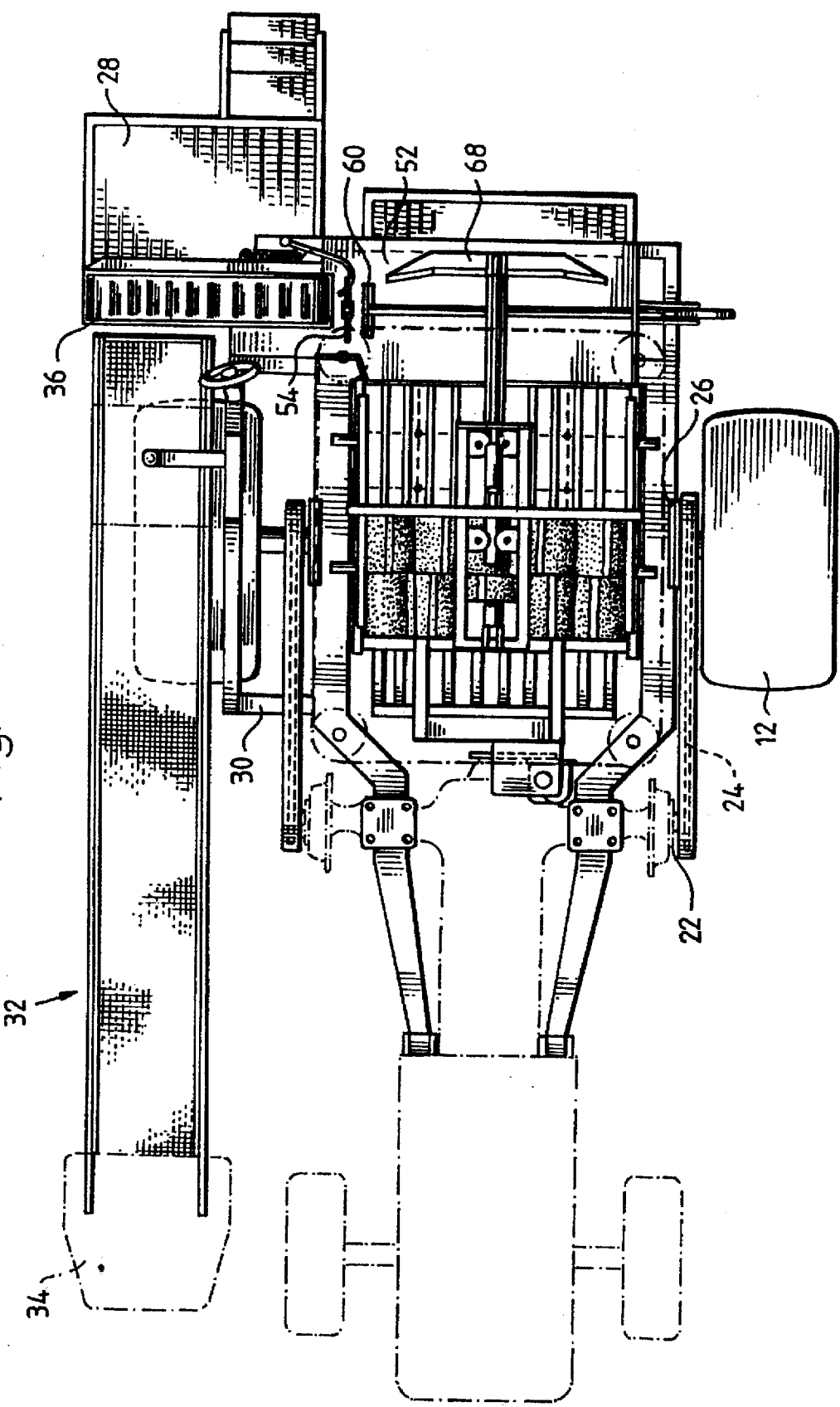
FIG. 2 shows a top plan view of the machine in FIG. 1.
Figure 7:
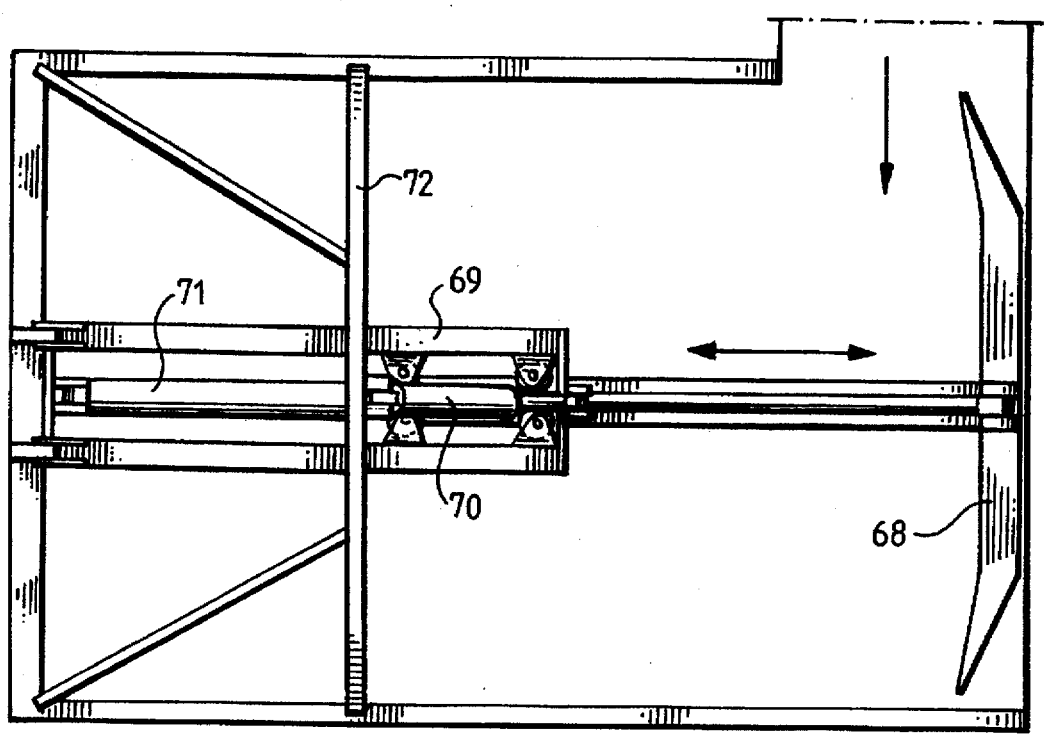
FIG. 7 shows a top plan view of the device in FIG. 6.
Figure 8:
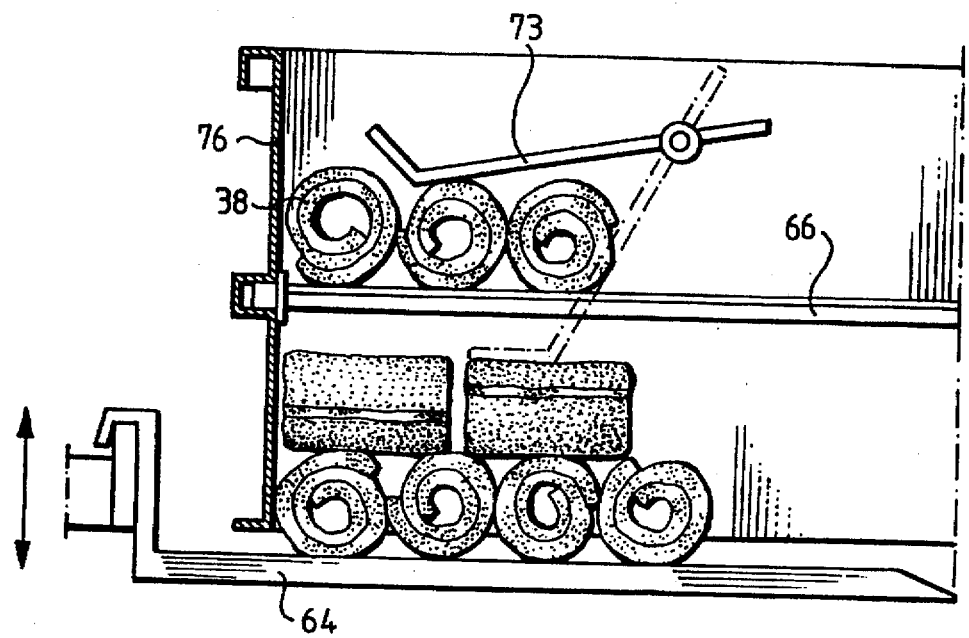
FIG. 8 shows a side view of a detail of a sensing device in the stacking-area of the machine.

In the shown embodiment each layer or bed of rolls is stacked on a fork lift 62 with forks 64 which run vertically in the lift 62 by means of a hydraulic cylinder or chain transmissions (not shown) or similar. The layers consist in the illustrated example of generally four sided or rectangular layers or beds, in which the rolls 38 on the lift forks 64 shown in FIG. 1 are arranged five laterally to the driving direction of the machine, while rolls 38 are situated in line next to each other in the driving direction of the machine. The rolls of this layer thus have not be turned in the rotation station, whereas the rolls 38 of the following layer shall be rotated a quarter of a turn in relation to the second layer. Independent of the rolls 38 being turned or not by side on the mat 52, the rolls are moved from the mat 52 to the forks 64 or support 66 by means of a rake 68 guided in a guiding frame 69 on top of the fork lift 62, which reciprocates in the arrow direction in FIG. 7 by means of a hydraulic cylinder 71. To return the rake 68 after feeding a row of sod rolls onto the support 66 to the original position shown in FIG. 2 on the mat 52 it has to be lifted over the bucker 60. This movement is effected by means of a rack 72 to which hydraulic cylinder 70 is attached and which lifts and lowers the rake 68 as shown with an arrow in FIG. 6. The support 66 is placed within a frame arranged with a box or bin 76 which is open to the rake 68 and open downwards under the support 66 to let a layer of rolls 38 fall down from the support 66 onto the forks 64. The forks 66 is as already said for example a roll front type and consists of two halves to be opened from the center of the support 66 so as to be pulled away to two opposite sides to let the layer of rolls 38 built up on the support 66 to fall down as previously described. Such a support is described in the previously mentioned Swedish patent 9002919-0 referred to for further details of the bottom 66. On the forks 64 of the lift a pallet can be arranged or some other bedding to carry the layers of rolls, or as shown, the rolls 38 of the lowest layer can be directly supported by the forks. In this case the fork lift has a special design and comprises a multitude of forks 64, e.g. six forks. As not every sod roll has the same diameter the lowering of the fork lift 62, 64 is according to FIG. 8 controlled by means of a sensor 73 in contact with the upper side of the sod roll layer, registrating the sod roll passage to a position with empty place for the next layer or bed of sod rolls 38 directly beneath the support 66 and then stops the lowering of the fork lift 62, 64.

Figure 9:
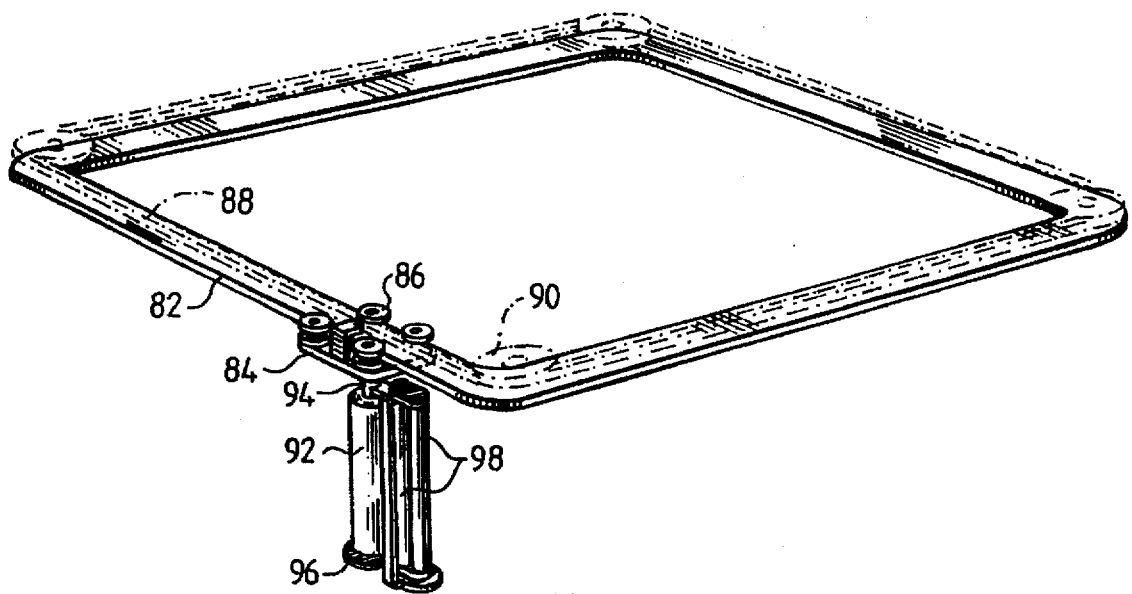
FIG. 9 shows a perspective view of a plastic packaging device for the sod rolls in the machine.
Figure 10:
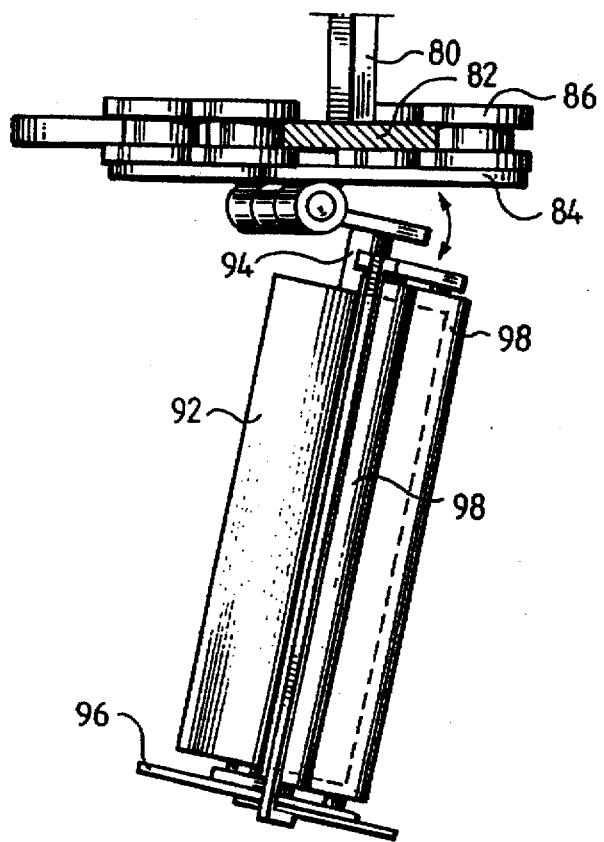
FIG. 10 shows a partially cut side view of the device in FIG. 9.
Figure 11:
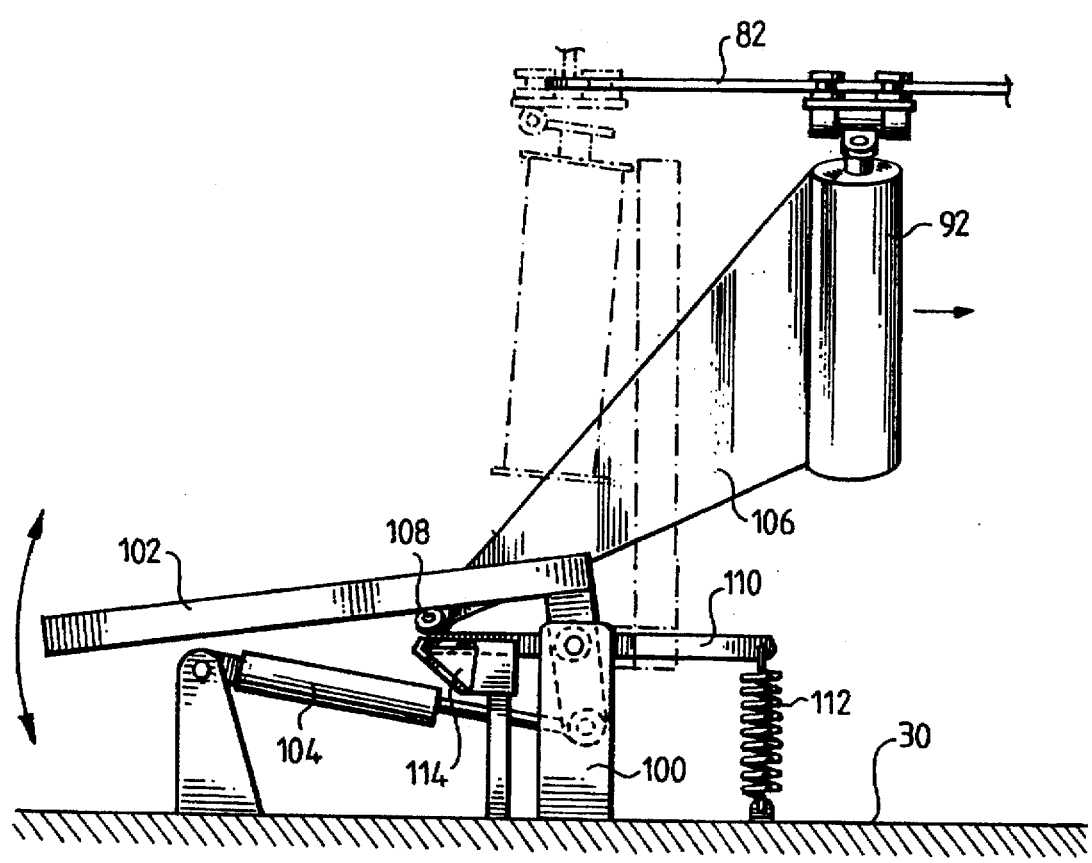
FIG. 11 shows a side view of a detail of the plastic packaging device.

When a sufficiently large number of layers is stacked on the fork lift 62, 64, usually six layers vertically, the thus formed stack of sod rolls can easily be put down on the ground by lowering the fork lift to the ground while the machine proceeds ahead the stack of rolls exiting through a corresponding opening in the aft part 74 of the machine frame 10. Before the completed stack leaves the machine its upper layer must be anchored so as to not let the stack fall apart. This is e.g. performed by winding a plastic foil, a net a tissue or similar material around the upper stack layer. The machine having a generally open bin 76 this is automatically achieved without the operator possibly leaving the machine and performing the anchoring by hand. The bin consists as previously mentioned of a box 76 situated on top of the framework or and there-by providing that the upper layer of sod rolls 38 in a stack are partly uncovered as shown in FIG. 1. Around the box a guide 82 is suspended by means of props 80 in a frame 78 here shown in a perspective view and in cross section in FIGS. 9 and 10, respectively. A carriage comprising a plate runs on the guide 82 with four wheels equipped with a central groove, with which the wheels engage the edges of the guide 82. A transmission consisting of a chain, a cord 88 or similar device is arranged for driving the carriage around the guide and also sprockets or pulleys 90, of which at least one is a driving one. On the carriage underside a socket is articulately fastened for a roll 92 of plastic foil, tissue or similar. The socket comprises a shaft 94 and a bottom plate 96. From the roll 92 the plastic foil passes a stretching device before it is wound up around the stack of sod rolls 38. The stretching device comprises two rolls or rollers 98, over which the foil or similar will pass. A bracket 100 is fastened to a portion of the machine frame 30 for pivotably supporting lever 102 being pivotable by means of a hydraulic cylinder 104 between the positions shown with continuous and with dotted lines. When starting the plastic covering of the stack, the lever 102 has attached the end 106 of the plastic foil against a roll 108 placed on one end of a lever 110, the other end of which is loaded by a spring 112. The end of the plastic foil being thus fixed the roll 92 is passed around the guide 82 and covers the upper part of the sod roll stack still remaining in the machine on the fork lift 62, 64 with plastic. After a passage of e.g. 3–4 times of the carriage with the roll 92 around the stack the lever 102 is lifted to the vertical position shown with dotted lines to free the foil end, i.e. the start end, locked by the lever 102 in its lowered position. When the carriage with the roll 92 passes around the next time, the foil is placed on the outside of the lever 102 and when lowered will drag the foil down to a locked position. The lever 102 is lowered further, the foil roll having stopped, while the roll 108 stands aside due to the spring load 112, the foil thereby comes in contact with a knife 114 and is cut off. The final end of the plastic covering foil is freed and can pivot upwards and be attached to the plastic wound around the sod roll stack. The lever 102 simultaneously holds back the start end 106 of the foil to be used to cover the next stack or sod roll package 38 with plastic.

According to the invention a sod harvesting machine has been achieved and a method to harvest sod rolls and to store them, with which machine a single operator or driver can perform the process from the harvesting to the storing of complete packages of sod rolls without any manual operation being necessary, i.e. without the operator leaving his seat on the platform 28.

The invention is of course not limited to the shown and described embodiment can be varied within the scope of the invention.

I claim:

1. A method for stacking cut sod on a machine wherein the cut sod has been formed into rolls in a rolling station carried by the machine, comprising the steps of:
    a) conveying first and second series of rolls from the rolling station toward a stacking area carried by the machine on a moveable conveyor surface with the rolls being substantially uniformly oriented in a first direction relative to one another on the conveyor surface;
    b) re-orienting one of said first and second series of rolls being conveyed at approximately 90° with respect to the first direction as said one of said first and second series of rolls is being transported on the moveable conveyor surface toward the stacking area by using the movement of the moveable conveyor to assist in effecting the re-orienting; and thereafter
    c) loading said first and second series of rolls into the stacking area so as to form alternating layers of said first and second series of rolls with said first series of rolls being oriented uniformly with respect to one another and said second number of rolls being uniformly oriented with respect to one another at approximately 90° with respect to said first series of rolls.

2. The method of claim 1 wherein during the re-orienting step, engaging a leading end of the rolls of said one of said first and second series of rolls as the rolls are being conveyed and retaining the leading end of the rolls engaged until the rolls have been re-oriented approximately 90°.

3. In a sod harvesting machine including means for cutting the sod and thereafter forming the sod into rolls in a rolling station the improvement comprising, moveable conveying means having a surface for conveying the rolls from the rolling station toward a stacking means carried by the machine, re-orienting means mounted adjacent said conveying means, means for selectively moving said re-orienting means so as to engage said rolls carried on said surface of said moveable conveying means so as to allow the movement of the moveable conveying means to effect a re-orienting of the rolls being conveyed toward said stacking means so that the rolls are conveyed alternatively in a first series of non-re-oriented rolls and a second series of re-oriented rolls and wherein the orientation of the second series of rolls is approximately 90° with respect to the first series of rolls, and means for layering said first and second series of rolls into said stacking means to form alternate layers of said first and second series of rolls in a vertical direction wherein each of said first series of rolls are oriented in a layer generally parallel with respect to one another and said second series of rolls are oriented in a layer generally perpendicularly with respect to said first series of rolls.

4. The sod harvesting machine of claim 3, wherein said re-orientation means includes a moveable lever having a crooked end adapted to engage an end portion of each of said second series of rolls to thereby retain said second series of rolls as they are conveyed so as to cause the rotation of the second series of rolls as they are conveyed towards the stacking means.

5. The sod harvesting machine of claim 4, in which said lever is supported in a pivotable bearing, said means for selectively moving said re-orienting means includes spring means for urging said lever to a first position for engaging the one end of the second series of rolls, a bucker engageable by said first lever to thereby retain said lever in said first position to engage the one end of the second series of rolls.

6. The sod harvesting machine of claim 5 wherein said lever is pivotable in said bearing to a second position wherein said crooked end is spaced from said conveying means, and means for selectively locking said lever in said second position.

7. The sod harvesting machine of claim 3, in which said re-orientation device includes a rotary disc mounted adjacent to said conveying means for selectively rotating the second series of rolls.

8. The sod harvesting machine of one of claims 4 through 6 wherein said stacking means includes a box-like frame having a retractable support on which the first and second series of rolls are alternatively received to thereby form alternating first and second layers, a lift means mounted below said box-like frame for receiving the alternating first and second layers of sod thereon, and said box-like frame including a lower portion extending below said retractable support for surrounding an upper layer of rolls stacked upon said lift means.

9. The sod harvesting machine of claim 3 wherein said stacking means includes a box-like frame having a retractable support on which the first and second series of rolls are alternatively received to thereby form alternating first and second layers, a lift means mounted below said box-like frame for receiving the alternating first and second layers of sod thereon, and said box-like frame including a lower portion extending below said retractable support for surrounding an upper layer of rolls stacked upon said lift means.

10. The sod harvesting machine of claim 9 including a sensor means mounted within said box-like frame for selectively engaging rolls in the first and second layers on said retractable support, means for connecting said sensing means to said lift means for selectively repositioning said lift means to lower said lift means to receive one of said alternating first and second layers of rolls mounted on said retractable support as said retractable support is retracted.

11. The sod harvesting machine of claim 9 including a wrapping device mounted to the machine in generally surrounding relationship with said lower portion of said box-like frame, said wrapping device including a generally continuous guide extending around a layer of rolls, a carriage movable along said guide and having a wrapping material support means for supporting a roll of wrapping material whereby at least one of the first and second layers of rolls passing from said retractable support to said lift means may be covered with a wrapping material as said carriage moves along said guide to thereby prevent the separation of the rolls.

12. The sod harvesting machine of claim 11 including a stretching device mounted adjacent to said wrapping material support means for stretching the wrapping material during the movement of said carriage along said guide.

13. The sod harvesting machine of claim 11 including a pivotable support lever movable from a first position normally spaced inwardly with respect to said guide to a second position spaced exteriorly of said guide, means for moving said pivotable support lever from said first to said second positions, means associated with said pivotable support lever for severing said wrapping material mounted on said wrapping material support means and for engaging a portion of said wrapping material mounted on said wrapping material support means when in said second position.

14. In a sod harvesting machine for producing stacked rolls of sod wherein the harvesting machine includes a cutting means for cutting lawn being harvested, a rolling station for rolling cut sod into rolls, a conveying means for conveying the rolls to a stacking means, and wherein means are provided for stacking the rolls in layers, a driving unit having steerable wheels, a frame attached to said driving unit, said frame carrying said cutting means, said rolling station, said conveying means and said stacking means, the improvement comprising:

an operator's platform mounted to said frame in spaced relationship relative to said driving unit, said platform extending rearwardly with respect to said cutting station, said rolling station, said conveying means and said stacking means in a direction of travel of said harvesting machine, whereby an operator has forward surveillance of each of said cutting means, said rolling means, said conveying means and said stacking means during operation of the sod harvesting machine.

15. The sod harvesting machine of claim 14 including drive wheels mounted to said frame, said driving unit being a tractor having front and rear axles, transmission means mounted to said rear axle and to said drive wheels mounted to said frame thereby transmitting power from said rear axle to said drive wheels.

16. The sod harvesting machine of claim 15 including frame elements for rigidly interconnecting said tractor to said frame.

17. The sod harvesting machine of claim 14 including a roll re-orienting means mounted adjacent said conveying means.

* * * * *